No. 608,488. Patented Aug. 2, 1898.
E. STORM.
THILL COUPLING.
(Application filed July 1, 1898.)
(No Model.)
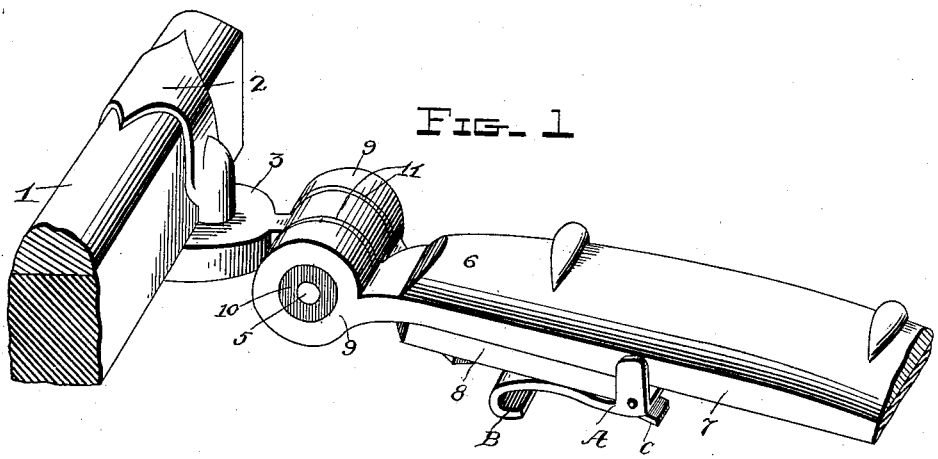
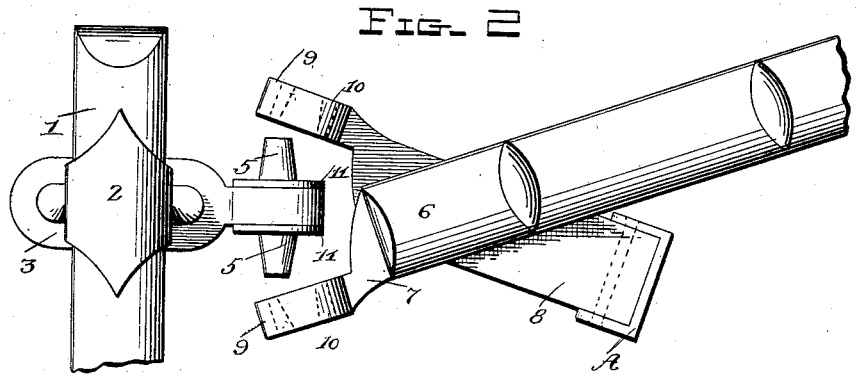
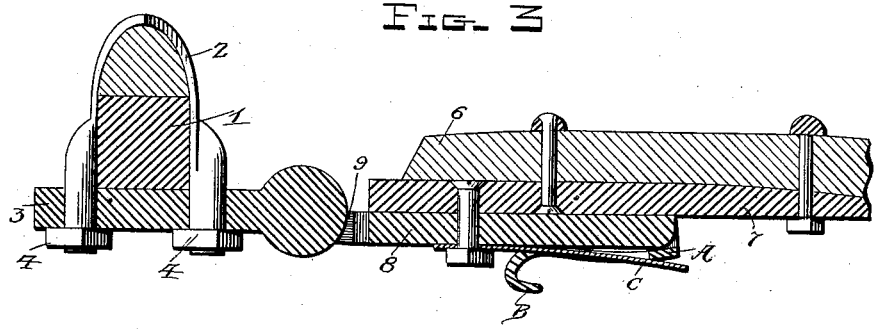
Witnesses
Inventor
Edward Storm.
by Benj. J. Cowl
Attorney.
THE NORRIS PETERS CO., PHOTO-LITHO., WASHINGTON, D. C.

UNITED STATES PATENT OFFICE.

EDWARD STORM, OF POUGHKEEPSIE, NEW YORK.

THILL-COUPLING.

SPECIFICATION forming part of Letters Patent No. 608,488, dated August 2, 1898.

Application filed July 1, 1898. Serial No. 684,972. (No model.)

*To all whom it may concern:*

Be it known that I, EDWARD STORM, a citizen of the United States, residing at Poughkeepsie, in the county of Dutchess and State of New York, have invented certain new and useful Improvements in Thill-Couplings; and I do hereby declare the following to be a full, clear, and exact description of the invention, such as will enable others skilled in the art to which it appertains to make and use the same.

The invention relates to thill-couplings; and the object is to improve the construction shown in my application for patent, Serial No. 668,161, filed January 27, 1898, by providing a more simple, inexpensive, and effective means for fastening the shear-lever members together.

With this object in view the invention consists in certain features of construction and combination of parts, which will be hereinafter fully described and claimed.

In the drawings, in which I have shown the preferred embodiment of my invention, Figure 1 is a perspective view of my improved thill-coupling, showing the shear members locked to the clip-studs. Fig. 2 is a top plan view showing the inner ends of the shear members spread apart, and Fig. 3 is a longitudinal sectional view through Fig. 1.

In the drawings, 1 denotes the axle; 2, the axle-clip; 3, the clip-plate; 4, the fastening-nuts, and 5 the laterally-projecting tapering bearing-studs. 6 denotes the inner end of the thill. 7 denotes one of the shear members, which is bolted to the thill. 8 denotes the other shear member, which is pivoted to the fixed shear member. 9 denotes lugs at the inner ends of the shear members, formed with spreading apertures for the tapering studs of the clip-plate. 10 denotes tapering packings fitted in the apertures of said lugs, and 11 denotes washers placed upon said tapering studs. As these parts are shown, described, and claimed in my application above referred to, a further detail description of the same is not deemed necessary, as the invention in the present case resides in the means for locking and unlocking the shear members, which means I will now proceed to describe.

A denotes a yoke pivoted to the forward end of the pivoted shear member, with its ends extending upward and engaging the sides of the fixed shear member and its cross-bar extending across under and engaging the lower side of the pivoted shear member, thus preventing the spreading of the said members one with respect to the other.

B denotes a handle projecting from the cross-piece of the bail and having its free end curved slightly downward to enable it to be readily grasped and operated.

C denotes a spring for engaging the handle and holding it closed.

I consider as falling within the scope of my invention any means for securing the yoke in locked position; but in the present case I have shown a spring for effecting this result and have shown the handle with a longitudinal opening, through which the spring projects, with its free end engaging the cross-piece of the yoke. I have also shown the outer end of the pivoted shear member as having its lower edge slightly curved to enable the bail to swing thereunder. The upper edge, however, is straight and will prevent the bail being swung above the plane of the upper side of the said pivoted shear member, so that there will be no liability in the act of swinging the members closed of the yoke projecting upward above the plane of the upper surface of the pivoted member and striking the fixed member, which would prevent the members being closed into engagement with the studs of the clip-plate.

Although I have specifically described the construction and relative arrangement of the several elements of my invention I do not desire to be confined to the same, as such changes or modifications may be made as clearly fall within the scope of the invention without departing from the spirit thereof.

What I claim is—

1. In combination, a clip-plate and pivoted shear members, the one being provided with studs and the other being provided with coacting bearing-lugs, a yoke pivoted to one of the members and adapted to be moved into engagement with the other member and thereby lock the two members against movement, and means for holding the yoke in locked position, substantially as specified.

2. In combination, a clip-plate and pivoted shear members, the one being provided with studs and the other being provided with coacting bearing-lugs, a yoke pivoted to one of the shear members and adapted to be swung into engagement with the other member and lock said members against movement, said yoke being provided with a handle that lies underneath one of the shear members, and a spring for locking said yoke in closed position, substantially as set forth.

3. In combination, a clip-plate and pivoted shear members, the one being provided with studs and the other being provided with co-acting bearing-lugs, a yoke pivoted to one of the shear members and adapted to be swung into engagement with the other member and lock said members against movement, said yoke being provided with a handle, said handle formed with a longitudinal opening, and a flat spring secured to one of said members and projecting through the opening in the handle and engaging the cross-piece of the yoke, substantially as set forth.

In testimony whereof I have hereunto set my hand in presence of two subscribing witnesses.

EDWARD STORM.

Witnesses:
  BENJ. G. COWL,
  JOHN A. SWEENEY.